UNITED STATES PATENT OFFICE.

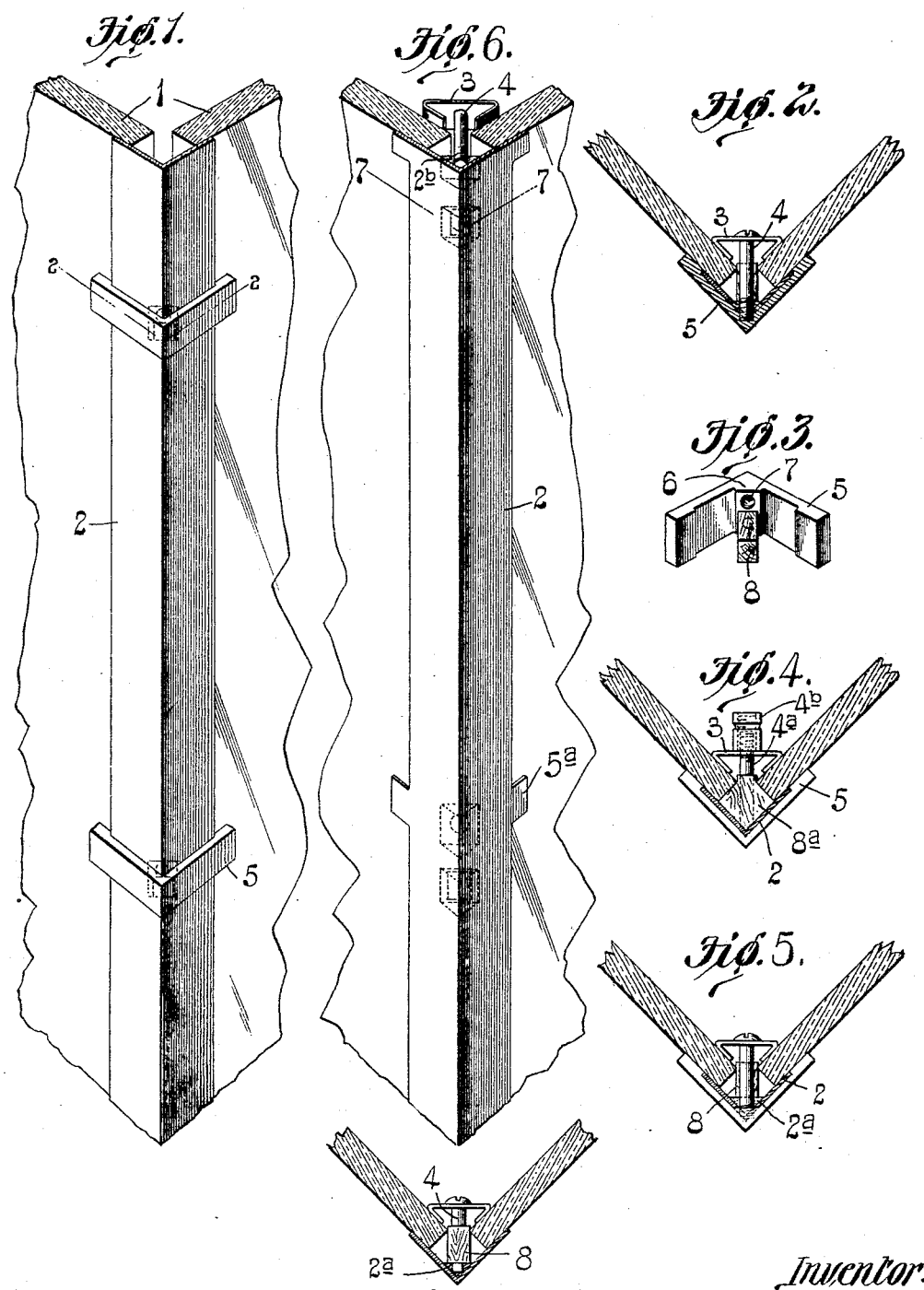

DANIEL J. MURNANE, OF KIRKWOOD, MISSOURI.

DEVICE FOR CONNECTING PLATES OF GLASS TOGETHER.

932,164. Specification of Letters Patent. Patented Aug. 24, 1909.

Application filed November 23, 1907. Serial No. 403,516.

*To all whom it may concern:*

Be it known that I, DANIEL J. MURNANE, a citizen of the United States, residing at Kirkwood, St. Louis county, Missouri, have invented a certain new and useful Improvement in Devices for Connecting Plates of Glass Together, of which the following is a full, clear, and exact description, such as will enable others skilled in the art to which it appertains to make and use the same, reference being had to the accompanying drawings, forming part of this specification, in which—

Figure 1 is a perspective view illustrating my improved device in operative position for connecting together two plates of glass arranged at an angle to each other; Fig. 2 is a cross sectional view taken on the line 2—2 of Fig. 1; Fig. 3 is a detail perspective view of one of the devices which embrace the outside clamping member; Fig. 4 is a cross sectional view illustrating a modified form of my invention; Fig. 5 is a cross sectional view illustrating another form of my invention; Fig. 6 is a perspective view illustrating still another form of my invention; and Fig. 7 is a cross sectional view taken on the line 7—7 of Fig. 6.

This invention relates to devices for connecting together two plates of glass, such, for example, as the devices used in the construction of show-cases and corner windows.

The main object of my invention is to provide a device for the purpose described that is of simple construction and which presents a neat and ornamental appearance.

Another object of my invention is to provide a device for the purpose described of improved construction which is provided with a non-metallic abutment or a plurality of non-metallic abutments that engage the edge portions of the plates of glass and thus prevent them from contacting with the part that connects the inside and outside clamping members of the device together.

Other desirable features of my invention will be hereinafter pointed out.

Referring to Fig. 1 of the drawings which illustrates one form of my invention, 1 designates two plates of glass arranged at an angle to each other, and 2 designates an outside clamping member that extends approximately the entire length of said plates so as to protect same, said member preferably consisting of a piece of comparatively thin or light-weight angle iron that engages the outside faces of the plates of glass 1. This angle or outside clamping member 2 preferably has short legs or flanges so that it will cover only a small portion of the plates, thus forming a small and neat corner-piece that prevents dust and dirt from entering the joint between the plates of glass.

Inside clamping members 3 which may be of any preferred construction, are arranged on the inside of the plates 1, as shown in Fig. 2, and means are provided for drawing the outside clamping member 2 and the inside clamping members 3 together so that they will securely clamp the plates of glass arranged between them. In the form of my invention shown in Figs. 1 and 2 the outside clamping member 2 and the inside clamping members 3 are held in intimate engagement with the plates 1 by means of screws 4 passing through the inside clamping members 3 and engaging devices 5 that embrace the outside clamping member 2, one of said devices 5 being provided for each inside clamping member 3. The devices 5 conform in shape to the outside clamping member 2 and preferably project beyond the side edges thereof, as shown in Fig. 1, so as to hide the inside clamping members and prevent them from being seen from the outside of the plates 1. In this way I am enabled to use a very small outside corner-piece and inside clamping members that are of sufficient size to obtain a firm bearing on the plates of glass, the portions of the devices 5 which project beyond the edges of the outside clamping member being arranged in alinement with the inside clamping members and thus hiding same. Each of the devices 5 is provided with a central lug or thickened portion 6 having a screw-threaded opening 7 that receives the screw 4, and the corner of the outside clamping member 2 is notched or cut away, as shown in Fig. 2, and also in dotted lines in Fig. 1, to provide a clearance for this lug 7 and thus permit the device 5 to snugly embrace the outside clamping member and force it into intimate engagement with the plates of glass.

Non-metallic abutments, preferably blocks of wood 8, of greater width or thickness than the screws, are arranged between the edge portions of the plates of glass 1 so as to prevent said plates from contacting with the screws 4 or other fastening devices that may be used for securing the outside clamping member and the inside clamping members together. In the form of my invention shown in Figs. 1, 2 and 3, these non-metallic abutments 8 are carried by the devices 5 which embrace the outside clamping member, each abutment being provided with a shank that projects into an opening in the thickened portion of the device 5 in alinement with the screw 4, the notch or cut-out portion in the corner of the outside clamping member being large enough to permit the abutments 8 to project therethrough and as said abutments are of greater width or thickness than the screws 4 they will prevent the edges of the plates of glass from contacting with said screws.

Instead of connecting the abutments 8 to the devices 5 I can form said abutments as shown in Fig. 4. In this form of my invention the abutments consist of wooden blocks 8ª that rest upon or are supported by the screws 4, said blocks conforming in cross section to the space between the plates of glass and having portions which project inwardly between the inside edges of said plates to hold them out of contact with the screws 4. If desired, the abutment 8ª, shown in Fig. 4, can consist of one continuous strip provided with openings for receiving the screws 4. This Fig. 4 also illustrates a slightly different means for connecting the devices 5 and inside clamping members together, each of said devices 5 being provided with an integral screw-threaded shank 4ª that passes through an opening in the inside clamping member and having a nut 4ᵇ mounted on the inner end thereof. In Fig. 5 I have also shown another way in which the abutments can be held in position. In the form shown in said figure the outside clamping member 2 is provided on its inner face with lugs or thickened portions 2ª that may be formed by solder or in any manner desired, and the abutments 8 are secured to these lugs 2ª and project inwardly between the edges of the plates of glass so as to hold them out of contact with the screws 4.

Instead of using devices 5 to force the outside clamping member against the plates of glass, said outside clamping member may be provided on its inside with thickened portions or lugs 2ᵇ having screw-threaded openings that receive the screws 4 which pass through the inside clamping members 3, as shown in Fig. 6, the abutments 8 also being connected to lugs or thickened portions 2ª on the inside corner of the clamping member 2, as shown in Fig. 7. These lugs or thickened portions 2ª and 2ᵇ on the inside corner of the clamping member 2 can be formed from any suitable material, and if desired, the outside clamping member can be provided throughout its entire length with a thickened portion at the junction of its two legs or flanges. The outside clamping member shown in Fig. 6, is provided with integral laterally projecting wings 5ª that are located in alinement with the inside clamping members 3 for the purpose of hiding said members, said wings performing the same function as the portions of the devices 5 that project beyond the edges of the outside clamping member 2, as shown in Fig. 1.

While I have herein shown screws for drawing the inside and outside clamping members into intimate engagement with the plates, it will, of course, be understood that the inside clamping members could be connected to the outside clamping member or to the devices which embrace same in numerous other ways without departing from the spirit of my invention.

Having thus described my invention, what I claim as new and desire to secure by Letters Patent is:

1. A device for the purpose described, comprising a continuous outside clamping member that is adapted to be placed in engagement with two plates of glass arranged adjacent each other, a plurality of devices that embrace said member and hold it in position, a plurality of inside clamping members, means for drawing said devices and inside clamping members toward each other, and a non-metallic block carried by each of said devices and projecting inwardly between the meeting edges of the plates of glass.

2. A device for the purpose described, comprising an outside clamping member, an inside clamping member, a metallic device passing through the inside clamping member and connected to the inner face of the outside clamping member for drawing said members toward each other, and a non-metallic block connected to the outside clamping member and projecting inwardly between the meeting edges of the plates of glass that said clamping members retain in position so as to hold said plates away from said metallic connecting device.

3. In a window structure, a continuous outside clamping member that is adapted to extend longitudinally of the edge portions of two plates of glass so as to cover the joint between same, a plurality of devices that embrace said clamping member and hold it in engagement with said plates, a plurality of inside clamps arranged in alinement with said devices, a shank connected to each of said devices and to the inside clamp that coöperates therewith, and a non-metallic block carried by each of said devices and projecting inwardly between the meeting edges of the plates of glass to hold said plates out of contact with the shank that connects said device to its coöperating inside clamp.

4. In a window structure, a continuous outside clamping member provided with a plurality of notches or openings, devices embracing said clamping member and provided with thickened portions that close said openings, inside clamps coöperating with said devices, a screw passing through each of said inside clamps and tapped into the thickened portion of the device that coöperates therewith, and a non-metallic block connected to the thickened portion of each of said devices and being of greater width than the screw that is tapped into said thickened portion.

In testimony whereof I hereunto affix my signature in the presence of two witnesses, this twentieth day of November 1907.

DANIEL J. MURNANE.

Witnesses:
 WELLS L. CHURCH,
 GEORGE BAKEWELL.